United States Patent
Hayase et al.

(10) Patent No.: US 8,368,951 B2
(45) Date of Patent: Feb. 5, 2013

(54) IMAGE PROCESSING SYSTEM AND METHOD

(75) Inventors: Yosuke Hayase, Yokohama (JP);
Shuichi Kumada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1215 days.

(21) Appl. No.: 11/431,863

(22) Filed: May 11, 2006

(65) Prior Publication Data

US 2006/0256361 A1 Nov. 16, 2006

(30) Foreign Application Priority Data

May 12, 2005 (JP) .................... 2005-140001

(51) Int. Cl.
*G06F 15/00* (2006.01)
(52) U.S. Cl. .............................. 358/1.9
(58) Field of Classification Search ............ 358/1.9, 358/1.2, 1.15, 537, 520, 1.12
See application file for complete search history.

(56) References Cited

U.S. PATENT DOCUMENTS

| | | | |
|---|---|---|---|
| 5,489,996 A * | 2/1996 | Oku et al. ............ | 358/518 |
| 5,960,110 A | 9/1999 | Usami | |
| 6,198,552 B1 * | 3/2001 | Nagae ............... | 358/518 |
| 6,348,976 B1 * | 2/2002 | Hayashi ............. | 358/1.2 |
| 6,396,595 B1 * | 5/2002 | Shimazaki .......... | 358/1.9 |
| 6,757,076 B1 * | 6/2004 | Mestha et al. ....... | 358/1.9 |
| 6,778,300 B1 * | 8/2004 | Kohler .............. | 358/529 |
| 6,798,530 B1 * | 9/2004 | Buckley et al. ...... | 358/1.13 |
| 6,919,972 B2 | 7/2005 | Kumada et al. | |
| 7,046,393 B2 * | 5/2006 | Zeng ................ | 358/1.9 |
| 7,173,718 B2 | 2/2007 | Iwata et al. | |
| 7,333,239 B2 | 2/2008 | Oshikawa et al. | |
| 2001/0055129 A1 * | 12/2001 | Shimizu ............. | 358/520 |
| 2002/0054314 A1 | 5/2002 | Takahashi | |
| 2002/0080373 A1 * | 6/2002 | Collette et al. ...... | 358/1.9 |

(Continued)

FOREIGN PATENT DOCUMENTS

| | | |
|---|---|---|
| JP | 10136219 | 5/1998 |
| JP | 10340164 | 12/1998 |

(Continued)

OTHER PUBLICATIONS

Japanese Office Action dated Jun. 4, 2010 in corresponding Japanese Application No. 2005-140001.

*Primary Examiner* — Benny Q Tieu
*Assistant Examiner* — Jeremiah Bryar
(74) *Attorney, Agent, or Firm* — Fitzpatrick, Cella, Harper & Scinto

(57) ABSTRACT

An image processing system includes a server apparatus and a plurality of image output apparatuses connected to the server apparatus is provided. The server apparatus comprises an intermediate code generation unit configured to generate an intermediate code on the basis of image data, and an intermediate code transmission unit configured to transmit the intermediate code to each of the plurality of image output apparatuses. Each of the plurality of image output apparatuses comprises an intermediate code reception unit configured to receive the intermediate code from the server apparatus, an output color correction unit configured to execute, for the intermediate code, color correction for output, a rendering unit configured to render an image on the basis of the intermediate code which has undergone the color correction and an image output unit configured to output the rendered image.

7 Claims, 23 Drawing Sheets

U.S. PATENT DOCUMENTS

| | | | |
|---|---|---|---|
| 2002/0124027 A1* | 9/2002 | Krueger et al. | 707/528 |
| 2003/0193688 A1* | 10/2003 | Namikata | 358/1.15 |
| 2003/0210414 A1* | 11/2003 | Kuno | 358/1.9 |
| 2004/0061912 A1 | 4/2004 | Ohga | |
| 2004/0184658 A1 | 9/2004 | Inoue | |
| 2005/0036157 A1* | 2/2005 | Takabayashi et al. | 358/1.9 |
| 2007/0103726 A1 | 5/2007 | Iwata et al. | |

FOREIGN PATENT DOCUMENTS

| | | |
|---|---|---|
| JP | 2001290622 | 10/2001 |
| JP | 2001324846 | 11/2001 |
| JP | 2004046339 A | 2/2004 |
| JP | 2004236174 A | 8/2004 |
| JP | 2004247914 A | 9/2004 |
| JP | 2004304773 A | 10/2004 |

* cited by examiner

F I G. 13
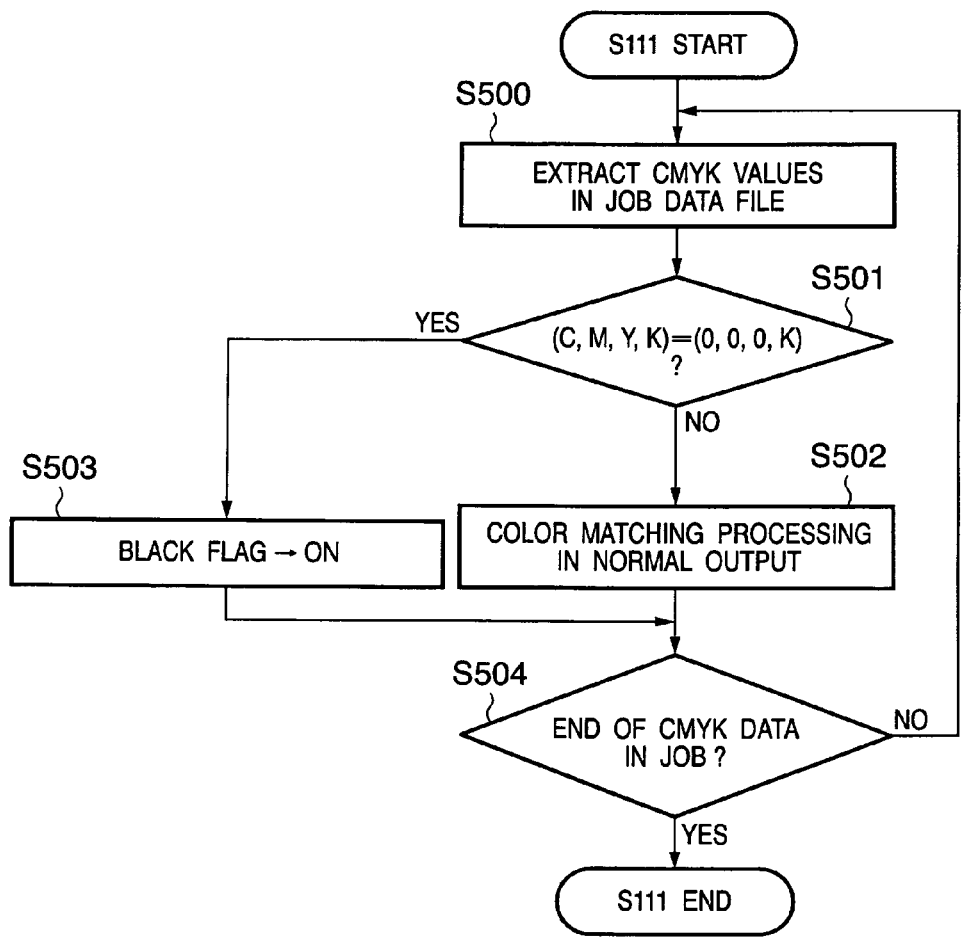

IMAGE PROCESSING SYSTEM AND METHOD

FIELD OF THE INVENTION

The present invention relates to an image processing system and method and, more particularly, to an image processing system and method which control clustering output to a plurality of printers.

BACKGROUND OF THE INVENTION

A system is known in which one print job is processed by two or more printers in parallel, i.e., clustering output can be executed by connecting a server apparatus and a plurality of color printers through a network. In this system, since a plurality of printers are used, faster output than printing by one printer can be done.

For example, Japanese Patent Laid-Open No. 2001-290622 describes a method of implementing high-speed clustering output. According to this reference, print data is converted into intermediate data and divided for each printer. Then, rasterization to printer-oriented final print data and transmission of the rasterized data to the printers are executed simultaneously in parallel.

In this clustering print system, even when a printer is inoperative, output by the remaining printers is possible. Hence, the system can guarantee a stable printing operation.

Moreover, in a technique described in, e.g., Japanese Patent Laid-Open No. 10-340164, a fault monitoring unit to monitor the status of each machine is provided on a network. When a failure occurs in a printer or machine, print data is diverted to another printer, thereby enabling recovery for each page.

For, e.g., clustering output of print data described in a page description language (PDL) such as PostScript, an optimum intermediate code data is preferably generated in each printer as an output target. In the conventional print system, interpreter processing is executed by preparing a software RIP (Raster Image Processor) with an interpreter for each printer on the server side and creating intermediate code data at a high speed or by executing interpreter processing for each printer one by one and outputting intermediate code data.

In the former case, however, the cost increases because of the software RIP. In the latter case, the processing speed decreases.

SUMMARY OF THE INVENTION

In view of the above problems in the conventional art, the present invention has an object to provide an image processing technique which efficiently create an intermediate code corresponding to each of a plurality of image output devices when a server apparatus outputs the same image data to them.

In one aspect of the present invention, an image processing system includes a server apparatus and a plurality of image output apparatuses connected to the server apparatus. The server apparatus comprises an intermediate code generation unit configured to generate an intermediate code on the basis of image data, and an intermediate code transmission unit configured to transmit the intermediate code to each of the plurality of image output apparatuses. Each of the plurality of image output apparatuses comprises an intermediate code reception unit configured to receive the intermediate code from the server apparatus, an output color correction unit configured to execute, for the intermediate code, color correction for output, a rendering unit configured to render an image on the basis of the intermediate code which has undergone the color correction and an image output unit configured to output the rendered image.

The above and other objects and features of the present invention will appear more fully hereinafter from a consideration of the following description taken in connection with the accompanying drawing wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 13 is a flowchart showing black preservation color matching processing (S111: CMYK input) in the job management server of the embodiment;

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

First Embodiment

System Configuration

Figure 1:
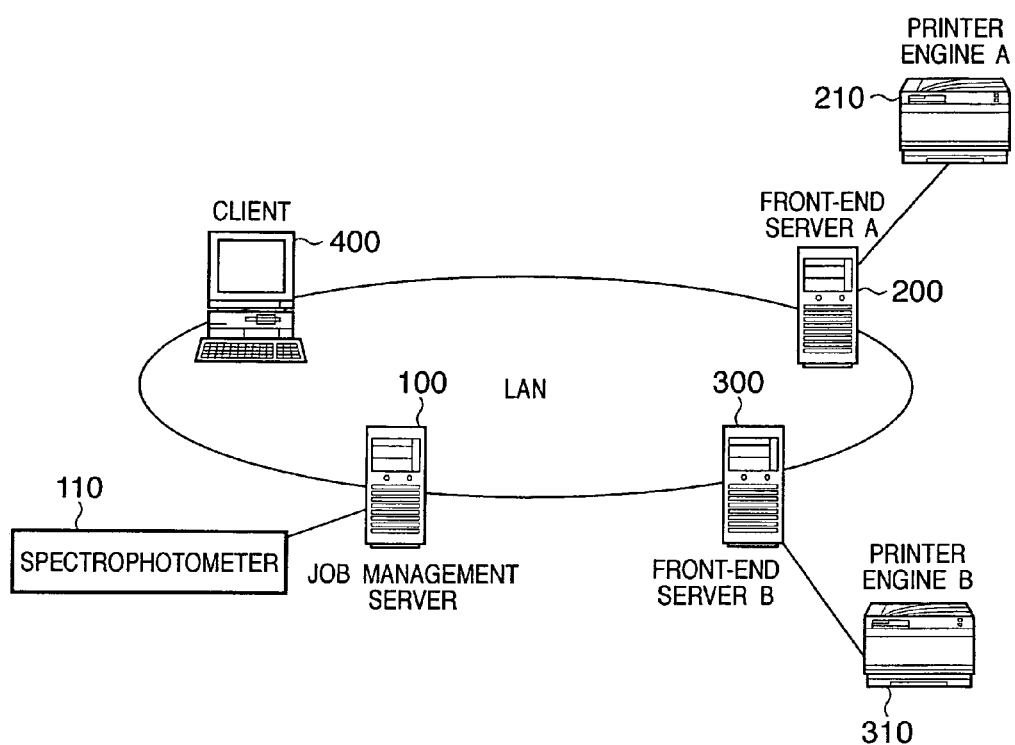
FIG. 1 is a view showing the configuration of a network system according to an embodiment of the present invention.

FIG. 1 is a view showing the configuration of a network system according to this embodiment. A job management server 100, front-end server A (200), front-end server B (300), and client 400 are connected by a LAN to be able to communicate with each other. A spectrophotometer 110 is connected to the job management server 100. Printer engines A (210) and B (310) are connected to the network through the front-end servers A (200) and B (300), respectively. The client 400 comprises, e.g., a CPU and VRAM necessary for monitor display and image processing and a communication function necessary for communication on the network.

Figure 2:
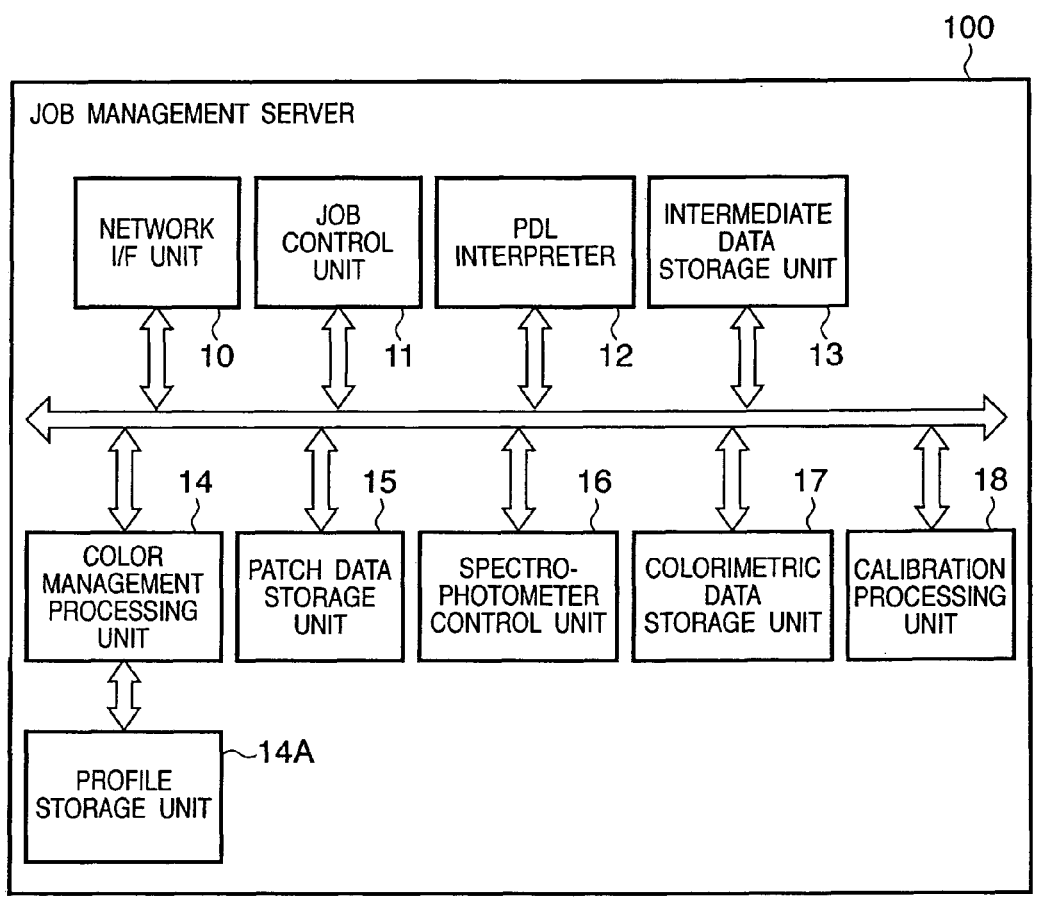
FIG. 2 is a block diagram showing the functional arrangement of a job management server.

FIG. 2 is a block diagram showing the functional arrangement of the job management server 100. Referring to FIG. 2, a network I/F (interface) unit 10 is a communication interface to connect the network. A job control unit 11 controls job data. A PDL interpreter 12 interprets PDL (Page Description Language) and generates intermediate data. An intermediate data storage unit 13 stores the intermediate data generated by the PDL interpreter 12. A color management processing unit 14 executes designated color matching processing for a job. A profile storage unit 14A stores profiles to be used for color matching. A patch data storage unit 15 stores color patch data for the profile correction using a fewer number of patches than that in the case of creating profile. A spectrophotometer control unit 16 controls the spectrophotometer 110. A calibration processing unit 18 executes the profile correction using a fewer number of patches than that in the case of creating profile.

Figure 3:
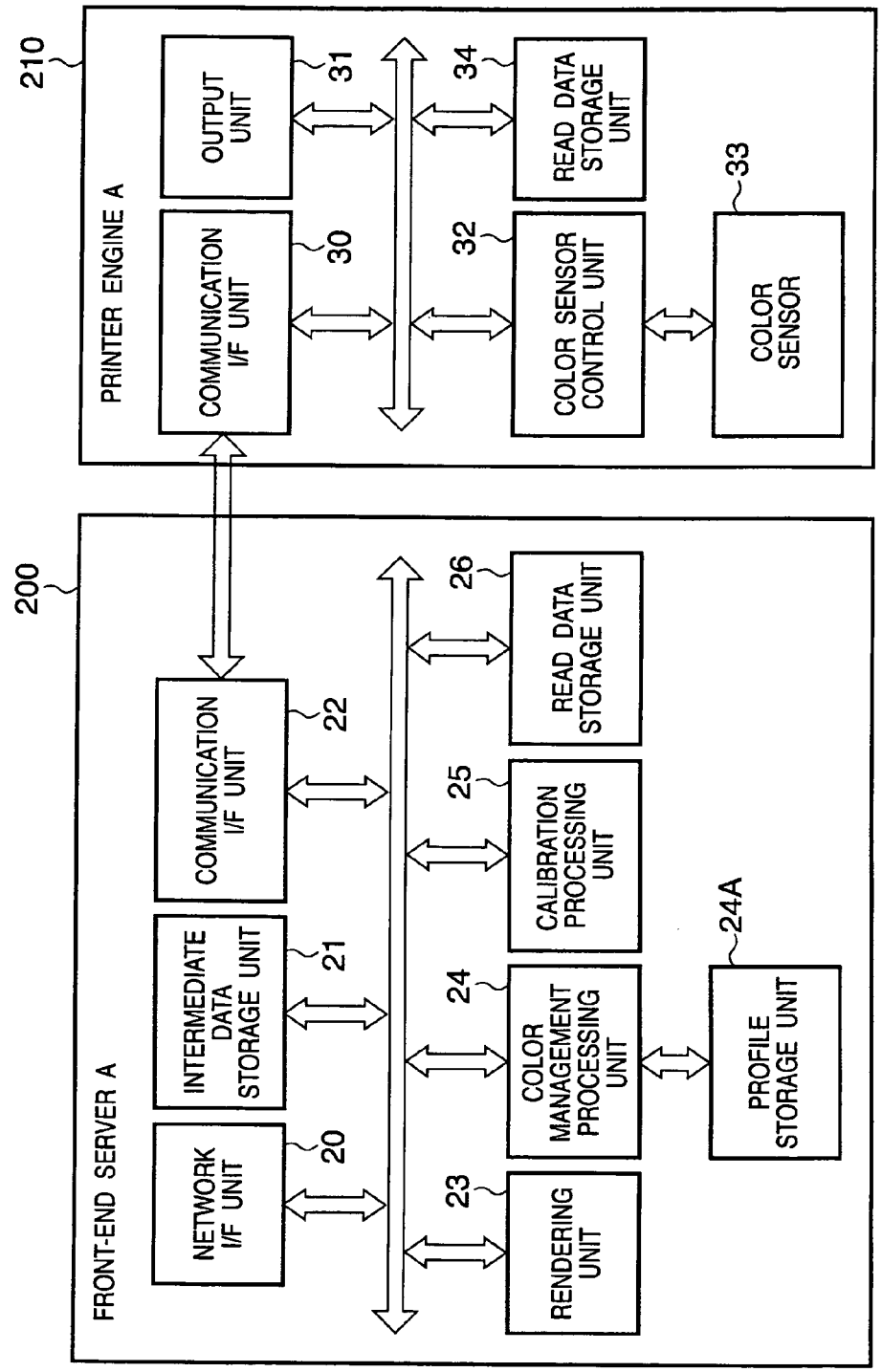
FIG. 3 is a block diagram showing the functional arrangements of a front-end server and a printer engine.

FIG. 3 is a block diagram showing the arrangements of the front-end server A 200 and printer engine A 210. The front-end server B 300 and printer engine B 310 have the same arrangements as in FIG. 3.

In the front-end server A 200 shown in FIG. 3, a network I/F (interface) unit 20 is a communication interface to connect to the network. An intermediate data storage unit 21 stores intermediate data transmitted from the job management server 100. A communication interface unit 22 is an interface to transmit/receive data to/from the printer engine A 210. A rendering unit 23 converts the intermediate data stored in the intermediate data storage unit 21 into bitmap image data. A color management processing unit 24 executes designated color matching processing for the intermediate data. A profile storage unit 24A stores profiles to be used for color matching. A calibration processing unit 25 executes the profile correction using a fewer number of patches than that in the case of creating profile. A read data storage unit 26 stores data read by a color sensor 33 of the printer engine A 210.

Figure 4:
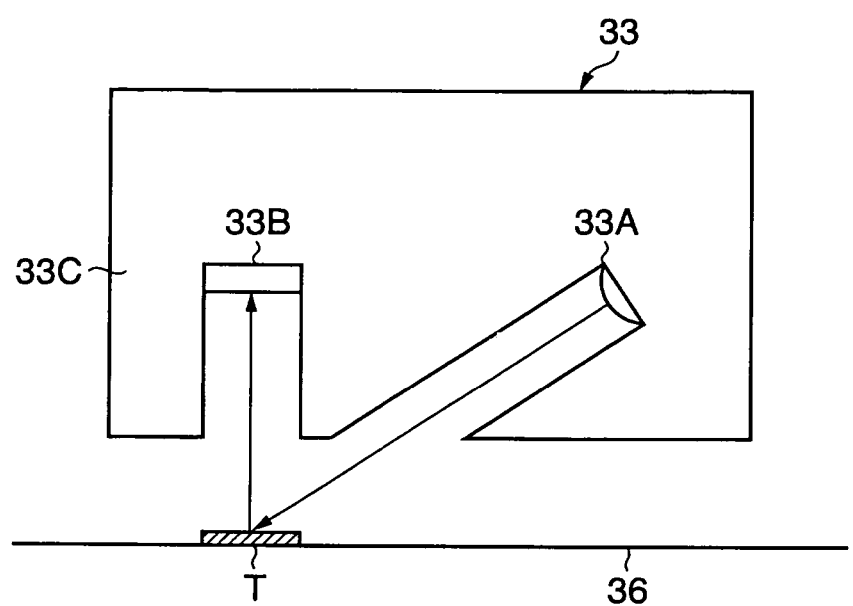
FIG. 4 is a view showing an arrangement example of a color sensor in the printer engine.

In the printer engine A 210, a communication I/F unit 30 transmits/receives data to/from the front-end server A 200. An output unit 31 performs print output. A color sensor control unit 32 controls the color sensor 33. The color sensor 33 reads a patch output. A read data storage unit 34 stores the data read by the color sensor 33. FIG. 4 shows an arrangement example of the color sensor 33 in the printer engine A 210. This arrangement example is the same as that described in Japanese Patent Laid-Open No. 2001-324846, and only its outline will be described here. As shown in FIG. 4, the color sensor 33 is formed by incorporating a light-emitting element 33A such as an LED and a light-receiving element 33B such as a photodiode or CdS in a holder 33C. A patch T on a transfer belt 36 is irradiated with light from the light-emitting element 33A. The light-receiving element 33B receives reflected light from the patch T, thereby measuring the density of the patch T.

Figure 5:
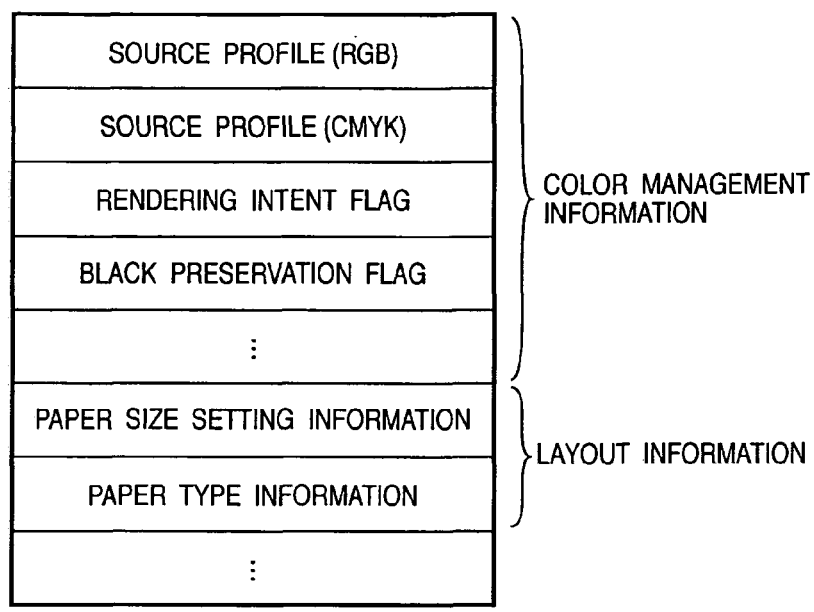
FIG. 5 is a view showing an example of print job ticket data.

FIG. 5 shows an example of print job ticket data of this embodiment. As shown in FIG. 5, job ticket data contains job setting information including color management information such as input and output profiles, rendering intent, and black preservation flag, and layout information such as the size and type of paper.

(Color Matching Processing)

Color Matching in Job Management Server

Figure 6:
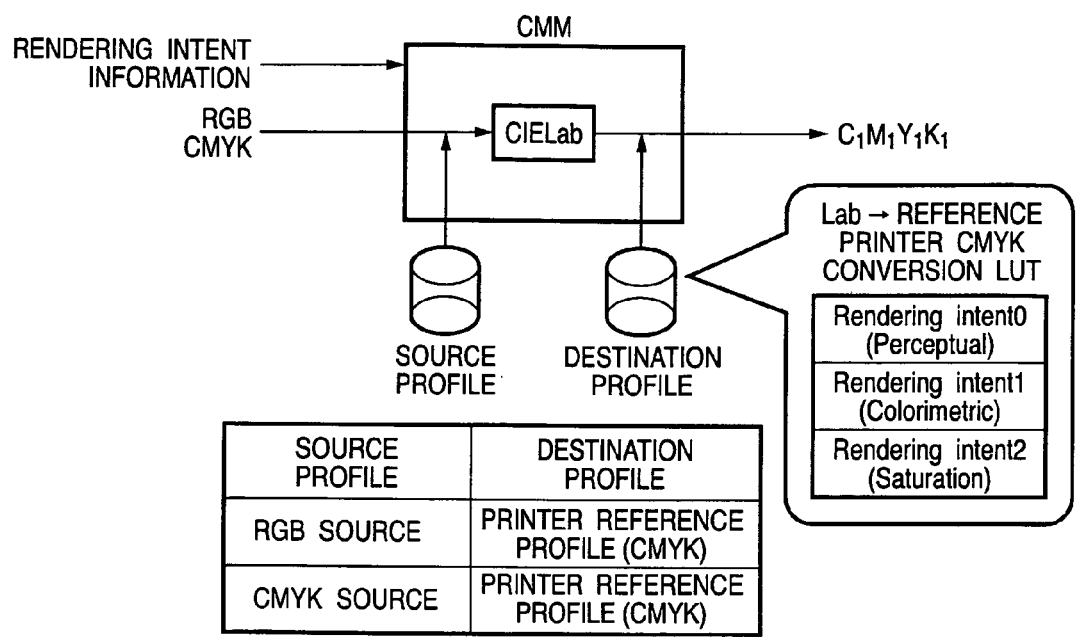
FIG. 6 is a view showing the outline of color matching processing executed in the job management server of the embodiment.

FIG. 6 is a view showing the outline of color matching processing executed by the color management processing unit 14 in the job management server 100. As a characteristic feature, color matching to the reference color space of a printer is executed.

Referring to FIG. 6, when RGB data or CMYK data is input, color matching is executed on the basis of a source profile, destination profile, and rendering intent information representing a color matching scheme, which are set in a color management module (CMM). The data is output as CMYK data (C1M1Y1K1) corrected on the color space of the reference printer.

Generally, there are three kinds of rendering intents: "Perceptual" to output a photo image, "Colorimetric" to faithfully reproduce, e.g., a logotype, and "Saturation" to clearly output a pie chart or text. As for color matching data for practicing the three schemes, Lab→reference printer CMYK conversion LUTs (lookup tables) are prepared as the destination profile, as shown in FIG. 6, in correspondence with the schemes. An LUT corresponding to set rendering intent information is selected and used for color matching.

In this embodiment, two cases are assumed, as shown in the table on the lower side of FIG. 6. In the first case, the source profile is an RGB source profile (e.g., sRGB profile), and the destination profile is a printer reference profile (CMYK). In the second case, the source profile is a CMYK source profile (e.g., JMPA profile), and the destination profile is a printer reference profile (CMYK).

Color Matching in Front-End Server

Figure 7:
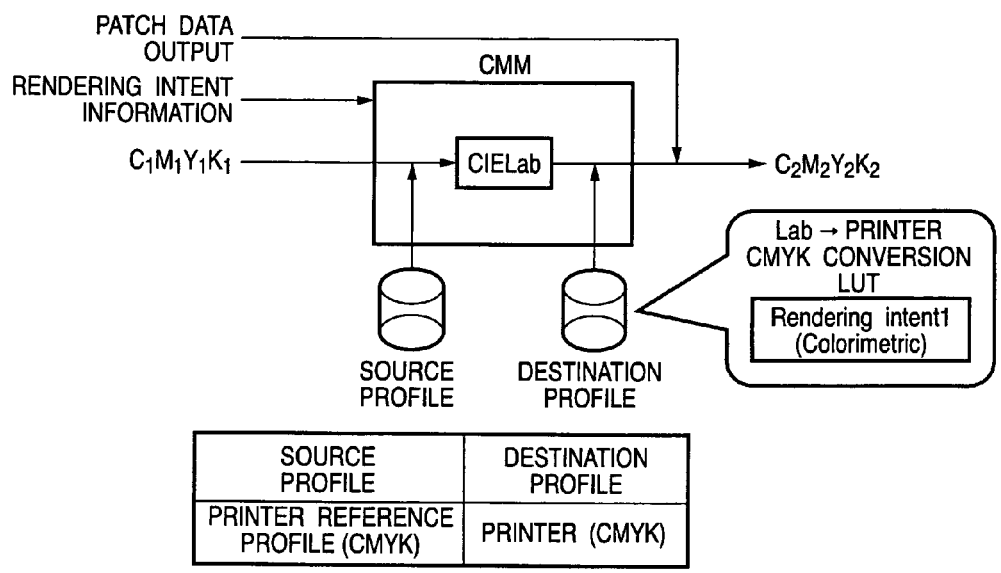
FIG. 7 is a view showing the outline of normal color matching processing executed in the front-end server of the embodiment.

FIG. 7 is a view showing the outline of color matching processing in normal output, which is executed by the color management processing unit 24 in the front-end server A 200 (or B 300). As a characteristic feature, color matching from the reference color space of a printer to the color space of an output printer (printer engine A 210) is executed.

Referring to FIG. 7, when CMYK data (C1M1Y1K1 transmitted from the job management server) is input, color matching is executed on the basis of a source profile, destination profile, and rendering intent information which are set in a CMM. The result is output as CMYK data (C2M2Y2K2) corrected on the color space of the output printer.

In this embodiment, "Colorimetric" is assumed as rendering intent in normal output of the front-end server. Hence, a Lab→printer CMYK conversion LUT for "Colorimetric" is prepared as the destination profile, as shown in FIG. 7, and used for color matching.

In this embodiment, a case is assumed, as shown in the table on the lower side of FIG. 7, in which the source profile is a printer reference profile (CMYK), and the destination profile is a printer profile (CMYK).

In outputting patch data for calibration, CMYK data prepared in advance is directly output without intervening the CMM.

Figure 8:
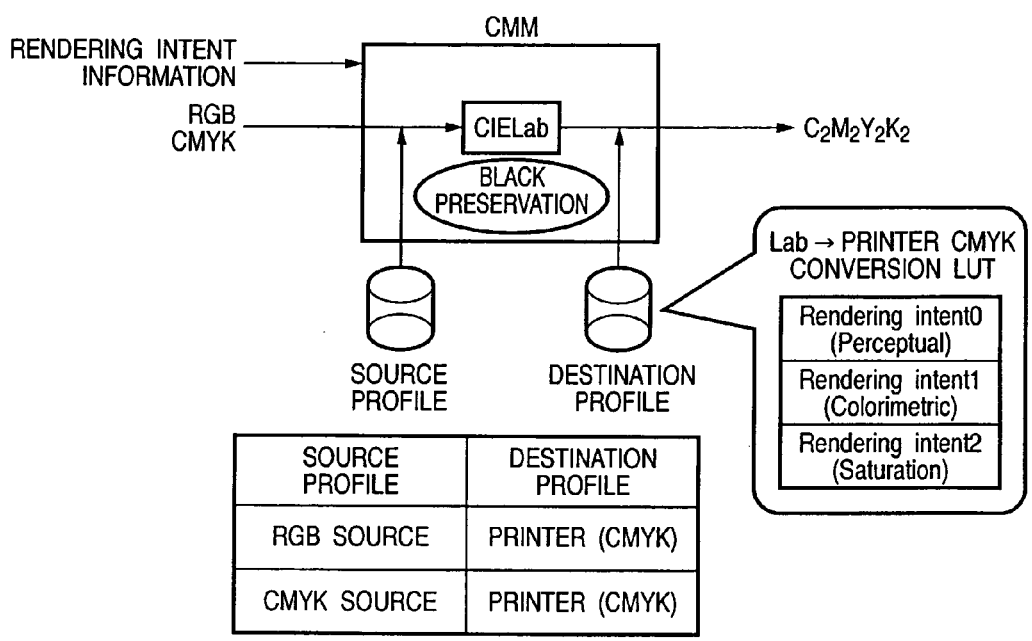
FIG. 8 is a view showing the outline of black preservation color matching processing executed in the front-end server.

FIG. 8 is a view showing the outline of black preservation color matching processing executed by the color management processing unit 24 in the front-end server A 200 (or B 300) when a black preservation flag is ON. As a characteristic feature, color matching to the color space of the output printer (printer engine A 210) is executed for only black data.

Referring to FIG. 8, when RGB data or CMYK data is input, color matching for black preservation is executed on the basis of a source profile, destination profile, and rendering intent information which are set in a CMM. The result is output as CMYK data (C2M2Y2K2) corrected on the color space of the output printer.

Three kinds of rendering intents, i.e., "Perceptual", "Colorimetric", and "Saturation" are present in black preservation output of the front-end server. Lab→output printer CMYK conversion LUTs are prepared as the destination profile, as shown in FIG. 8, in correspondence with the schemes. An LUT corresponding to rendering intent information is used for color matching.

In this embodiment, a case is assumed, as shown in the table on the lower side of FIG. 8, in which the source profile is an RGB source profile or CMYK source profile, and the destination profile is a printer profile (CMYK).

(Clustering Output)

Figure 9:
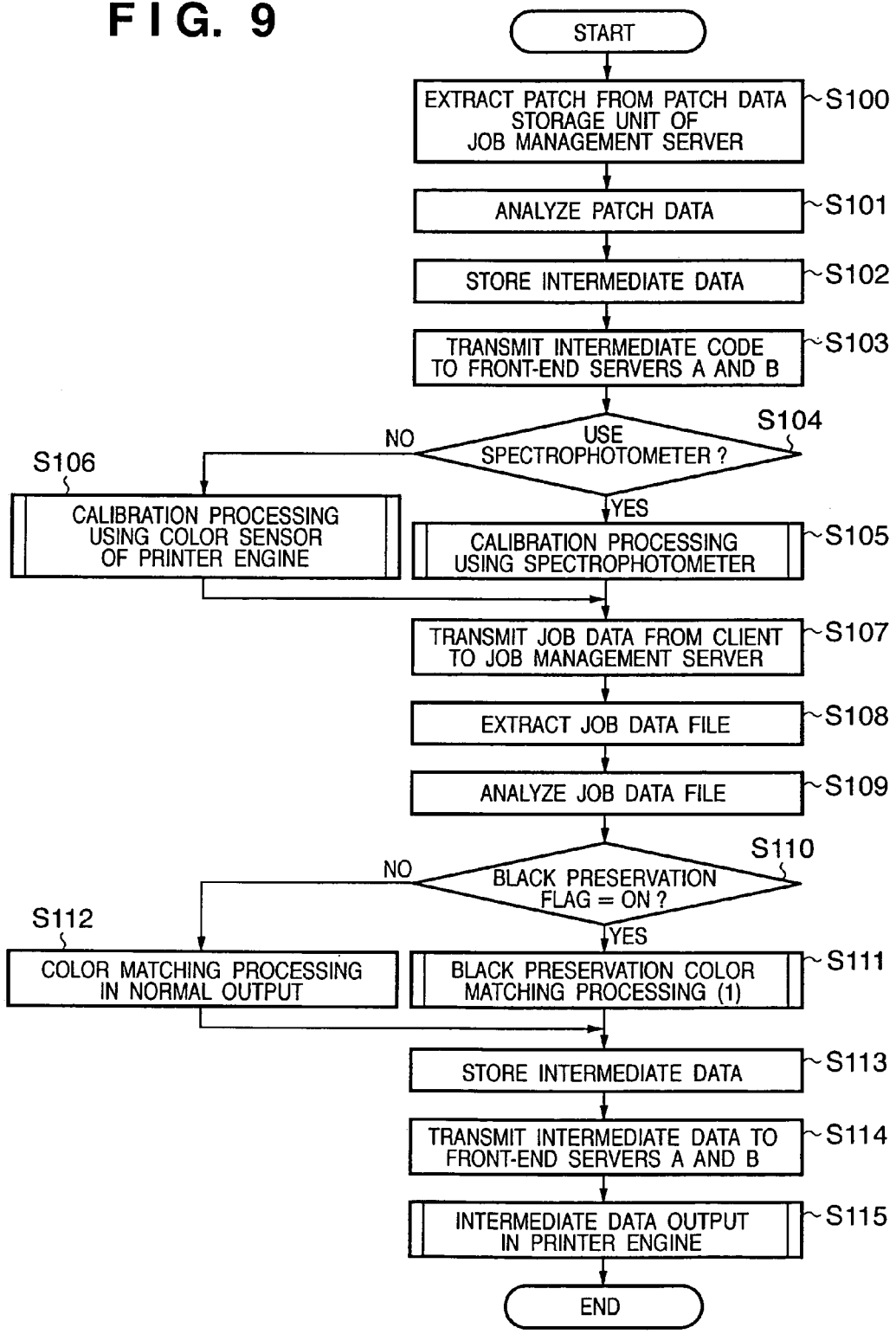
FIG. 9 is a flowchart showing the main processing of clustering output of the embodiment.

FIG. 9 is a flowchart showing the main processing of clustering output of the embodiment. This processing is executed by the job management server 100, front-end server A 200, and front-end server B 300 to control clustering output of the printer engines A 210 and B 310.

First, patch data is extracted from the patch data storage unit 15 of the job management server 100 (S100). The patch data is analyzed by the PDL interpreter 12 (S101). Intermediate data as the analysis result is stored in the intermediate data storage unit 13 (S102) and transmitted to the front-end servers A 200 and B 300 (S103).

In the front-end servers A 200 and B 300, patch output is done by the printer engines A 210 and B 310 on the basis of the received intermediate data, and calibration processing based on the colorimetric value is executed. If the spectrophotometer 110 is used to acquire the color value of the patch data, calibration processing using the spectrophotometer 110 is executed in the job management server 100 (S105). If the spectrophotometer 110 is not used, the color sensor is used. Hence, calibration processing using the color sensors 33 of the printer engines A 210 and B 310 is executed in the front-end servers A 200 and B 300 (S106). Details of the calibration processing will be described later.

The client 400 transmits print job data to the job management server 100 (S107). The job control unit 11 of the job management server 100 extracts a job data file in the received Job (S108). The PDL interpreter 12 analyzes the job data file (S109).

Depending on whether to save a black plate (S110) in color matching processing, i.e., when the black preservation flag shown in FIG. 5 is ON, the color management processing unit 14 executes black preservation color matching processing (to be described later) (S111). When the black preservation flag is OFF, the color management processing unit 14 executes normal color matching processing (S112). The normal color matching processing is executed by using an RGB source profile or CMYK source profile as the source profile and a printer reference profile (CMYK) as the destination profile shown in FIG. 6. When the source profile is an RGB profile, processing is performed while setting "Perceptual" or "Saturation" in the rendering intent flag shown in FIG. 5. When the source profile is a CMYK profile, processing is performed while setting "Colorimetric" in the rendering intent flag.

Intermediate data generated by the color matching is stored in the intermediate data storage unit 13 (S113) and transmitted to the front-end servers A 200 and B 300 (S114). When the intermediate data is output from the printer engines A 210 and B 310 (S115), the clustering output of this embodiment is ended.

As described above, the following effect can be obtained by the clustering output of this embodiment. The intermediate data of printer reference CMYK created by one PDL interpreter processing (S109) can be subjected to calibration processing (S115 (S602 and S603 in FIG. 14 to be described later)) corresponding to each of two printers and output.

(Calibration Processing Using Colorimeter)

Figure 10:
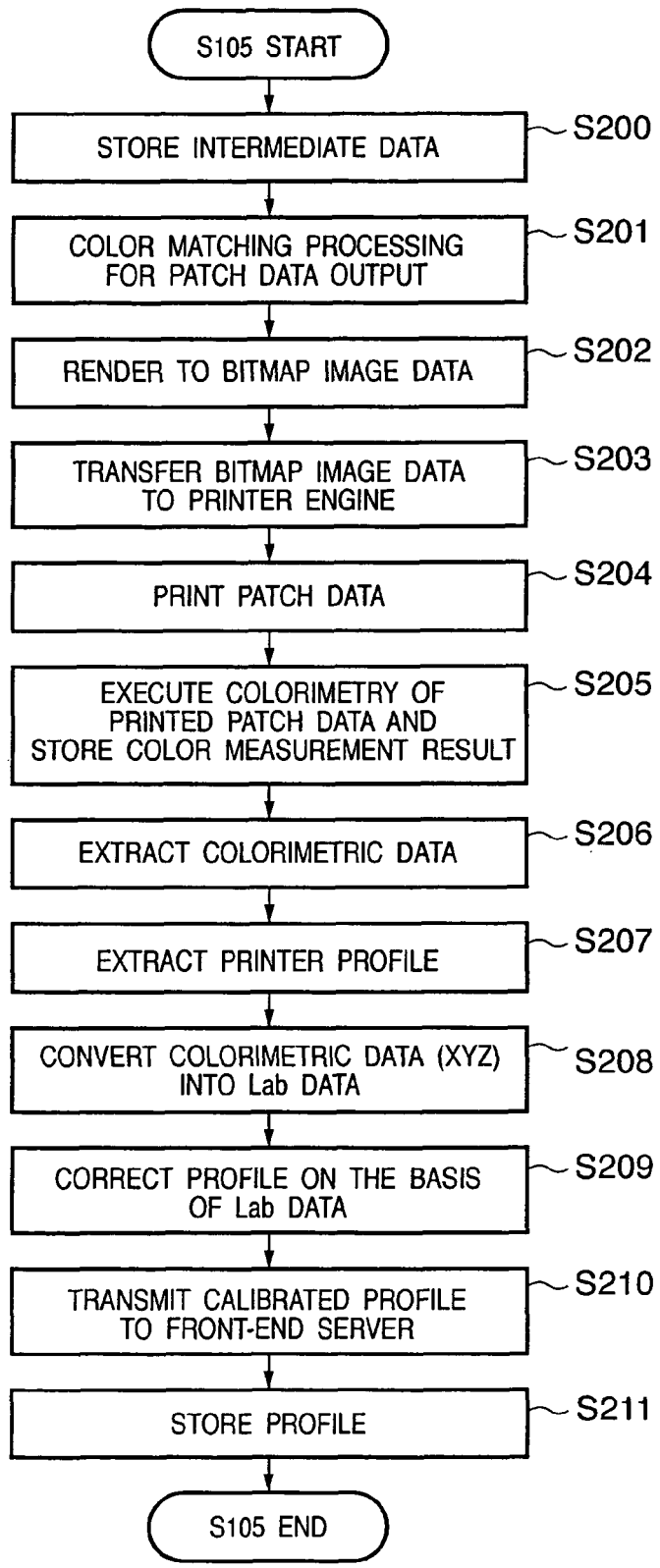
FIG. 10 is a flowchart showing calibration processing (S105) using a spectrophotometer.

FIG. 10 is a flowchart showing details of the above-described calibration processing using the spectrophotometer 110 in step S105 in FIG. 9. This calibration processing is executed in the front-end servers A 200 and B 300. Processing in the front-end server A 200 will be exemplified here.

Intermediate data transmitted from the job management server 100 is stored in the intermediate data storage unit 21 of the front-end server A 200 (S200). The color management processing unit 24 executes processing in patch data output shown in FIG. 7 (S201). That is, no color matching processing is executed here.

The rendering unit 23 renders the intermediate data to bitmap image data for printer output (S202). The rendered bitmap image data is transferred to the printer engine A 210 (S203). The patch data is printed (S204).

Color Measurement of the printed patch data is done by the spectrophotometer 110 connected to the job management server 100. The calorimetric result (calorimetric data) is stored in the colorimetric data storage unit 17 of the job management server 100 (S205).

The calibration processing unit 18 of the job management server 100 extracts the calorimetric data from the colorimetric data storage unit 17 (S206) and the printer profile from the profile storage unit 14A (S207). The colorimetric data expressed by the XYZ calorimetric system is converted into Lab data (S208). The printer profile is corrected on the basis of the Lab data (S209). To correct the profile, a correction method based on a small number of patch data colorimetric values as described in, e.g., Japanese Patent Laid-Open No. 10-136219 can be used.

When profile correction is ended, the job management server 100 transmits the calibrated printer profile to the front-end server A 200 (S210). The front-end server A 200 stores the received profile in the profile storage unit 24A (S211).

(Calibration Processing Using Color Sensor)

Figure 11:
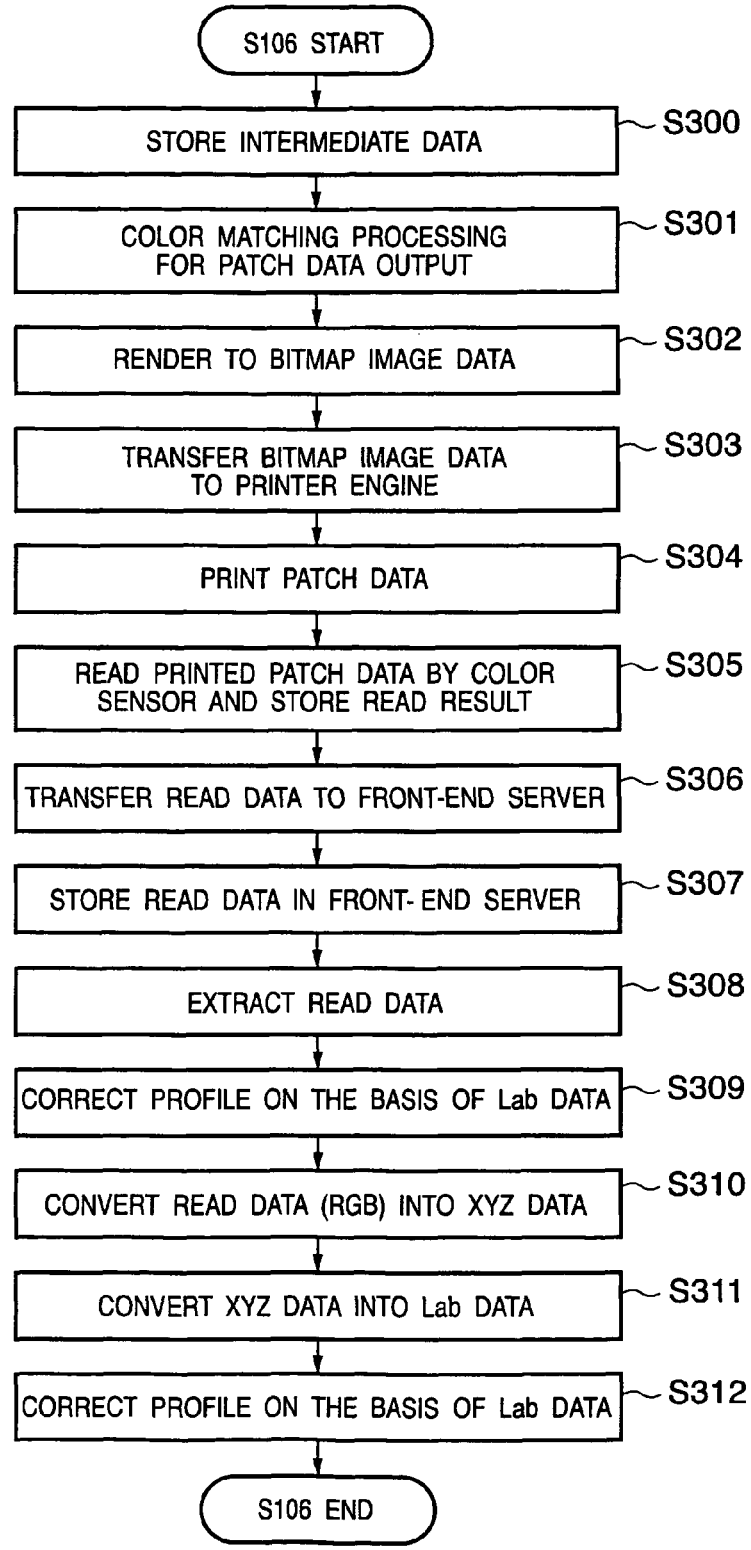
FIG. 11 is a flowchart showing calibration processing (S106) using a color sensor.

FIG. 11 is a flowchart showing details of the above-described calibration processing using the color sensor in step S106 in FIG. 9. This calibration processing is executed in the front-end servers A 200 and B 300. Processing in the front-end server A 200 will be exemplified here.

Intermediate data transmitted from the job management server 100 is stored in the intermediate data storage unit 21 of the front-end server A 200 (S300). The color management processing unit 24 executes processing in patch data output shown in FIG. 7 (S301). That is, no color matching processing is executed here.

The rendering unit 23 renders the intermediate data to bitmap image data for printer output (S302). The rendered bitmap image data is transferred to the printer engine A 210 (S303). The patch data is printed (S304).

The printed patch data is read by the color sensor 33 provided in the printer engine A 210. The read data is stored in the read data storage unit 34 of the printer engine A 210 (S305). The read data is transferred to the front-end server A 200 (S306) and stored in the read data storage unit 26 of the front-end server A 200 (S307).

In the front-end server A 200, the read data is extracted from the read data storage unit 26 (S308). The printer profile is extracted from the profile storage unit 24A (S309). The read data is converted into XYZ data (S310). The XYZ data is converted into Lab data (S311). The printer profile is corrected on the basis of the Lab data and set in the profile storage unit 24A (S312). To correct the profile the same method as that in the above-described processing using the spectrophotometer can be used.

(Black Plate Saving Color Matching Processing in Job Management Server (RGB Input))

Figure 12:
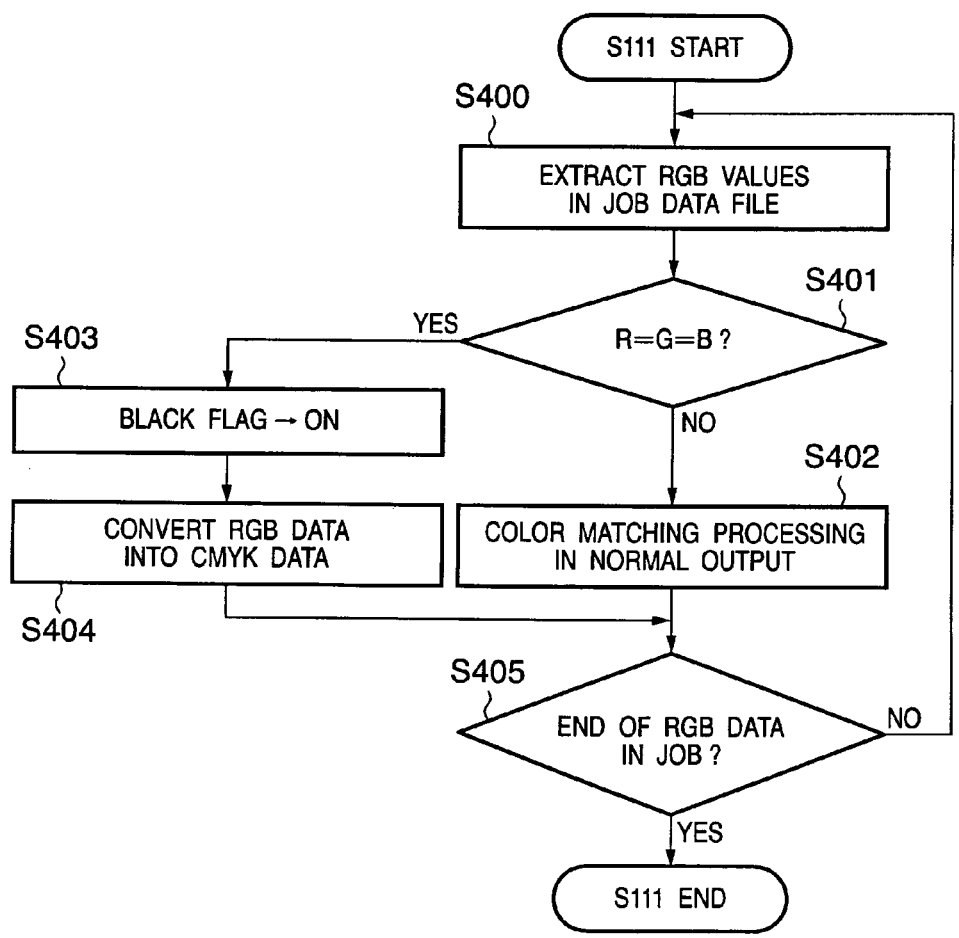
FIG. 12 is a flowchart showing black preservation color matching processing (S111: RGB input) in the job management server of the embodiment.

FIG. 12 is a flowchart showing details of the above-described processing in step S111 in FIG. 9, i.e., black preservation color matching processing by the color management processing unit 14 in the job management server 100 particularly when the input color space is an RGB space.

RGB data in the job data file is extracted (S400). If R=G=B, i.e., the data is black (gray) data, the black flag for the data is turned on (S403), and the RGB values are converted into CMYK values (S404).

C=0, M=0, Y=0, K=255−R

The black flag is set individually for all color data in black preservation color matching processing of this embodiment. The black flag is OFF in the initial state. This flag is used to select normal color matching processing (black flag=OFF) or black preservation color matching processing (black flag=ON) to be executed for the color data.

If NO in step S401, the color management processing unit 14 executes normal color matching processing (S402). The normal color matching processing is executed by using an RGB source profile as the source profile and a printer reference profile (CMYK) as the destination profile shown in FIG. 6. The processing is performed while setting 'Perceptual' or "Saturation" in the rendering intent flag shown in FIG. 5.

If RGB data remains in the job data file in step S405, the flow returns to step S400. If no RGB data remains, the color matching processing is ended.

With the above-described processing, when the input color space is an RGB space, the color management processing unit 14 in the job management server 100 can create intermediate data having the printer reference CMYK values saved as the black plate.

(Black plate Saving Color Matching Processing in Job Management Server (CMYK Input))

FIG. 13 is a flowchart showing details of the above-described processing in step S111 in FIG. 9, i.e., black preservation color matching processing by the color management processing unit 14 in the job management server 100 particularly when the input color space is a CMYK space.

CMYK data in the job data file is extracted (S500). If (C,M,Y,K)=(0,0,0,K), i.e., the data is black (gray) data, the black flag for the data is turned on (S503). Otherwise, the color management processing unit 14 executes normal color matching processing (S502). The normal color matching processing is executed by using a CMYK source profile as the source profile and a printer reference profile (CMYK) as the destination profile shown in FIG. 6. The processing is performed while setting "Colorimetric" in the rendering intent flag shown in FIG. 5.

If CMYK data remains in the job data file in step S504, the flow returns to step S500. If no CMYK data remains, the color matching processing is ended.

With the above-described processing, when the input color space is a CMYK space, the color management processing unit 14 in the job management server 100 can create intermediate data having the printer reference CMYK values saved as the black plate.

(Output Processing from Printer Engine)

Figure 14:
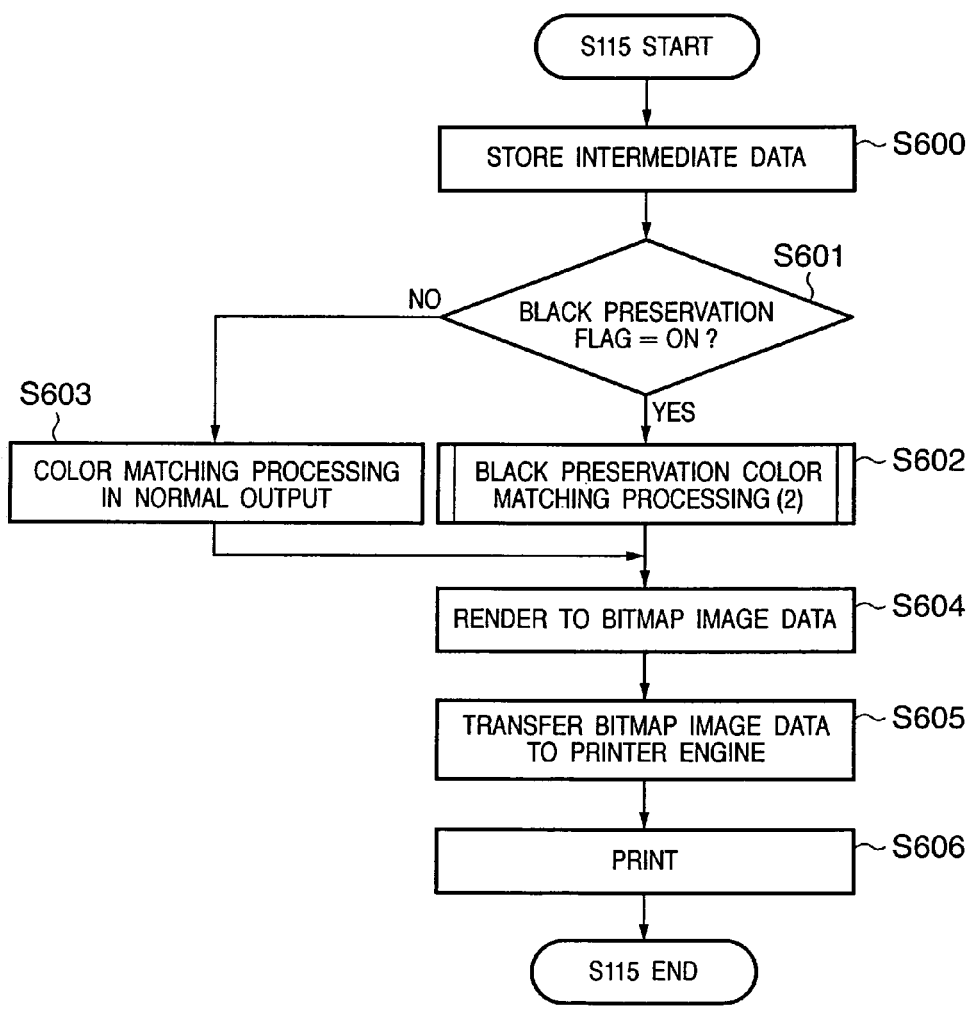
FIG. 14 is a flowchart showing intermediate data output processing (S115) from the printer engine.

FIG. 14 is a flowchart showing details of the above-described intermediate data output processing from the printer engine in step S115 in FIG. 9. This processing is executed in the front-end servers A 200 and B 300. Processing in the front-end server A 200 will be exemplified here.

Intermediate data transmitted from the job management server 100 is stored in the intermediate data storage unit 21 (S600). Depending on whether to save a black plate (S601) in color matching processing, the color management processing unit 24 operates differently. When the black preservation flag shown in FIG. 5 is ON, the color management processing unit 24 executes black preservation color matching processing (to be described later) (S602).

On the other hand, when the black preservation flag is OFF, the color management processing unit 24 executes normal color matching processing (S603). The normal color matching processing is executed by using the printer reference profile as the source profile and a printer profile (CMYK) as the destination profile shown in FIG. 7. Processing is performed while setting "Colorimetric" in the rendering intent flag shown in FIG. 5. The printer profile used here has been corrected by the above-described calibration processing in step S105 or S106 in FIG. 9.

The rendering unit 23 renders the intermediate data to bitmap image data for printer output (S604). The rendered bitmap image data is transferred to the printer engine A 210 (S605). The bitmap image data is printed by the printer engine A 210, and the processing is ended (S606).

(Black Plate Saving Color Matching Processing in Front-End Server (RGB Input))

Figure 15:
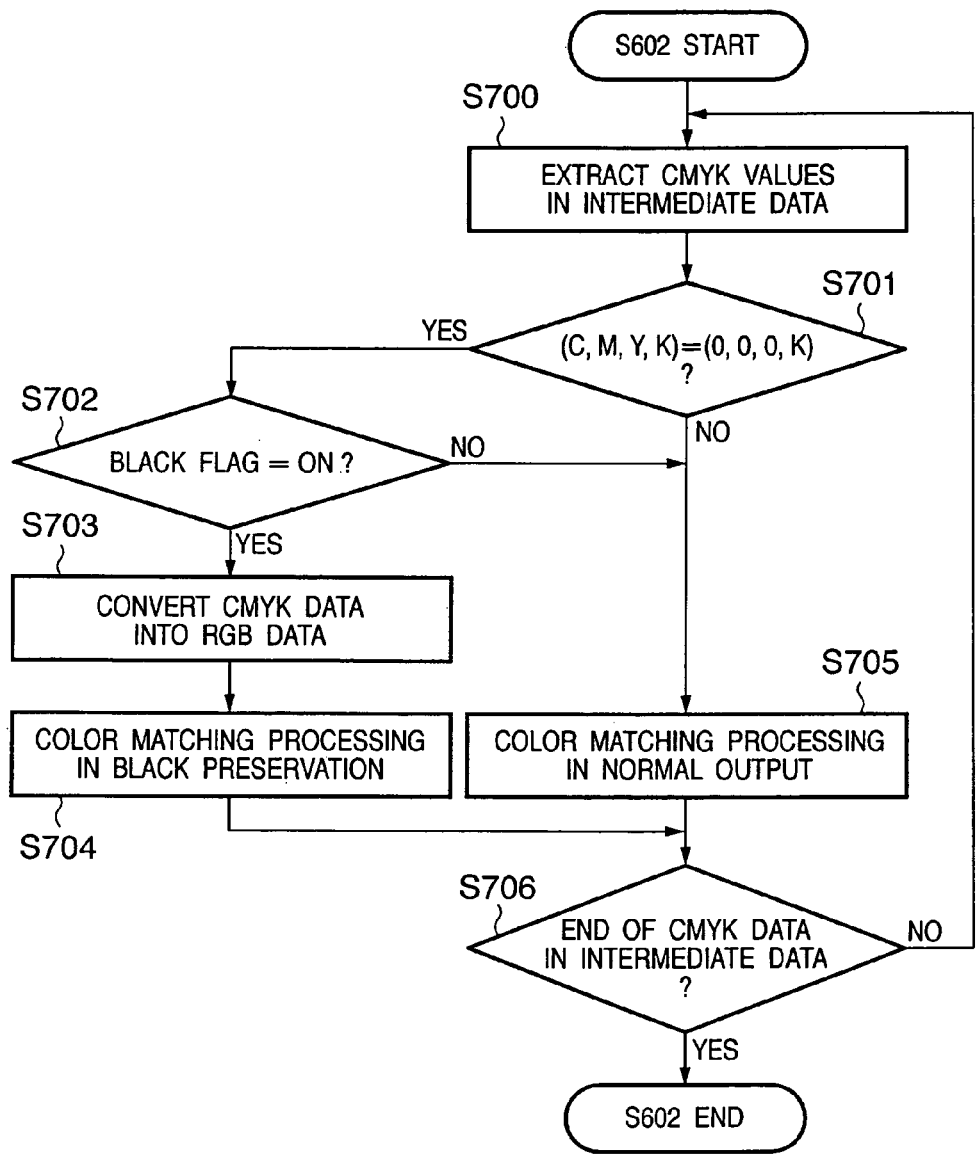
FIG. 15 is a flowchart showing black preservation color matching processing (S602: RGB input) in the front-end server of the embodiment.

FIG. 15 is a flowchart showing details of the above-described processing in step S602, i.e., black preservation color matching processing by the color management processing units 24 in the front-end servers A 200 and B 300 particularly when the input color space is an RGB space. This processing is executed in the front-end servers A 200 and B 300. Processing in the front-end server A 200 will be exemplified here.

CMYK data in the intermediate data file is extracted (S700). If (C,M,Y,K)=(0,0,0,K), i.e., the data is black (gray) data (S701), and the black flag of the data is ON (S702) the CMYK data is converted into RGB values (S703).

R=255−K, G=255−K, B=255−K

The black flag is set in black preservation color matching processing (S111 in FIG. 9) in the job management server 100.

The color management processing unit 24 executes black preservation color matching processing (S704). The processing is executed by a method described in, e.g., Japanese Patent Laid-Open No. 2004-120566. The processing is executed by using an RGB source profile as the source profile and a printer profile (CMYK) as the destination profile shown in FIG. 8 while setting "Perceptual" or "Saturation" in the rendering intent flag.

If the black flag is OFF, or (C,M,Y,K)≠(0,0,0,K), the color management processing unit 24 executes normal color matching processing (S705). The normal color matching processing is executed by using a printer reference profile (CMYK) as the source profile and a printer profile as the destination profile shown in FIG. 7. The processing is executed while setting "Colorimetric" in the rendering intent flag.

If CMYK data remains in the job data file, the flow returns to step S700. If no CMYK data remains, the processing is ended.

The printer profile used in the color matching processing in steps S704 and S705 has been corrected by the above-described calibration processing in step S105 or S106 in FIG. 9.

With the above-described processing, when the input color space is an RGB space, the color management processing unit 24 in the front-end server A 200 can create intermediate data having the printer CMYK values saved as the black plate.
(Black Plate Saving Color Matching Processing in Front-End Server (CMYK Input))

Figure 16:
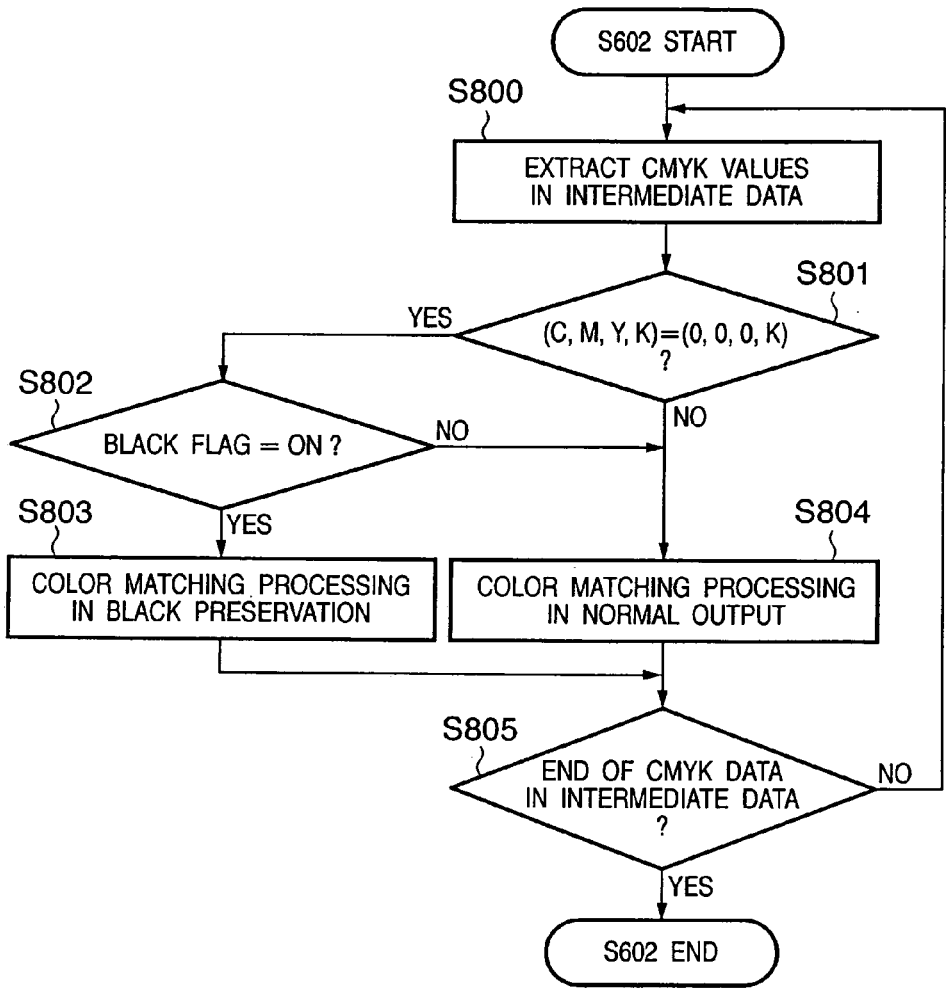
FIG. 16 is a flowchart showing black preservation color matching processing (S602: CMYK input) in the front-end server of the embodiment.

FIG. 16 is a flowchart showing details of the above-described processing in step S602, i.e., black preservation color matching processing by the color management processing units 24 in the front-end servers A 200 and B 300 particularly when the input color space is a CMYK space. This processing is executed in the front-end servers A 200 and B 300. Processing in the front-end server A 200 will be exemplified here.

CMYK data in the intermediate data file is extracted (S800). If (C,M,Y,K)=(0,0,0,K), i.e., the data is black (gray) data, and the black flag of the data is ON (S802), the color management processing unit 24 executes black preservation color matching processing (S803). The black flag is set in black preservation color matching processing (S111 in FIG. 9) in the job management server 100. The black preservation color matching processing is executed by a method in, e.g., Japanese Patent Laid-Open No. 2004-120566. The processing is executed by using a CMYK source profile as the source profile and a printer profile (CMYK) as the destination profile shown in FIG. 8 while setting "Colorimetric" in the rendering intent flag.

If the black flag is OFF, or (C,M,Y,K)≠(0,0,0,K), the color management processing unit 24 executes normal color matching processing (S804). The normal color matching processing is executed by using a printer reference profile (CMYK) as the source profile and a printer profile as the destination profile shown in FIG. 7 while setting "Colorimetric" in the rendering intent flag.

If CMYK data remains in the job data file, the flow returns to step S800. If no CMYK data remains, the processing is ended.

The printer profile used in the color matching processing in steps S803 and S804 has been corrected by the above-described calibration processing in step S105 or S106 in FIG. 9.

With the above-described processing, when the input color space is a CMYK space, the color management processing unit 24 in the front-end server A 200 can create intermediate data having the printer CMYK values saved as the black plate.
(Effects of Embodiment)

As described above, according to this embodiment, in clustering output using a plurality of color printers through the network, the job management server 100 creates intermediate data by one PDL interpreter processing. Then, each front-end server to control each printer executes, for the intermediate data, calibration suitable for each printer and outputs the data. Hence, efficient clustering output can be done, and cost performance can be improved.

Second Embodiment

The second embodiment of the present invention will be described below.

In the above-described first embodiment, a printer reference CMYK color space is applied as the color space of intermediate data. As a characteristic feature of the second embodiment, a Lab color space is used. The system and device components in the second embodiment are the same as in the above-described first embodiment, and a description thereof will be omitted.

Figure 17:
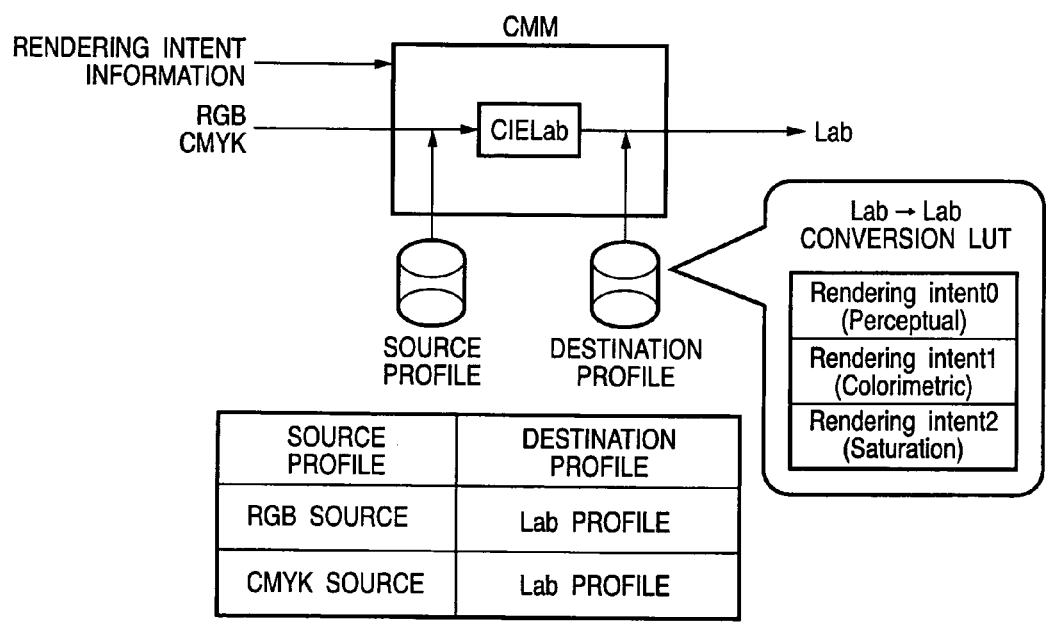
FIG. 17 is a view showing the outline of color matching processing executed in a job management server according to the second embodiment.

In the second embodiment, normal color matching processing in the job management server shown in FIG. 6 of the first embodiment is replaced with processing shown in FIG. 17. Normal color matching processing in the front-end server shown in FIG. 7 is replaced with processing shown in FIG. 18. Black plate saving color matching processing operations in the job management server shown in FIGS. 12 and 13 are replaced with processing operations shown in FIGS. 19 and 20, respectively. Black plate saving color matching processing operations in the front-end server shown in FIGS. 15 and 16 are replaced with processing operations shown in FIGS. 21 and 22, respectively. The remaining processing operations are the same as in the first embodiment.

The processing operations replaced in the second embodiment will be described below.
(Color Matching in Job Management Server)

FIG. 17 is a view showing the outline of color matching processing executed by a color management processing unit 14 in a job management server 100 according to the second embodiment. As a characteristic feature, color matching to a Lab color space is executed.

Referring to FIG. 17, when RGB data or CMYK data is input, color matching is executed on the basis of a source profile, destination profile, and rendering intent information representing a color matching scheme, which are set in a CMM. The data is output as Lab data corrected on a Lab color space.

In the second embodiment, a case is assumed, as shown in the table on the lower side of FIG. 17, in which the source profile is an RGB source profile or CMYK source profile, and the destination profile is a Lab profile.
(Color Matching in Front-End Server)

Figure 18:
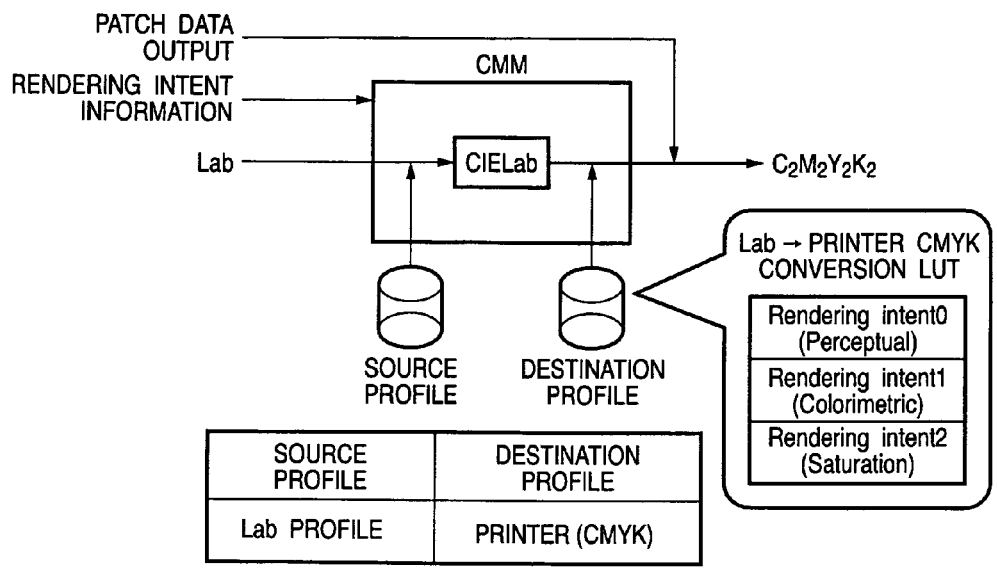
FIG. 18 is a view showing the outline of normal color matching processing executed in a front-end server according to the second embodiment.

FIG. 18 is a view showing the outline of color matching processing in normal output, which is executed by a color management processing unit 24 in a front-end server A 200 (or B 300). As a characteristic feature, color matching from a Lab color space to the color space of an output printer (printer engine A 210) is executed.

Referring to FIG. 18, when Lab data is input, color matching is executed on the basis of a source profile, destination profile, and rendering intent information which are set in a CMM. The result is output as CMYK data (C2M2Y2K2) corrected on the color space of the output printer.

In the second embodiment, a case is assumed, as shown in the table on the lower side of FIG. 18, in which the source profile is a Lab profile, and the destination profile is a printer profile (CMYK).

In outputting patch data for calibration, CMYK data prepared in advance is directly output without intervening the CMM.

(Black Plate Saving Color Matching Processing in Job Management Server (RGB Input))

Figure 19:
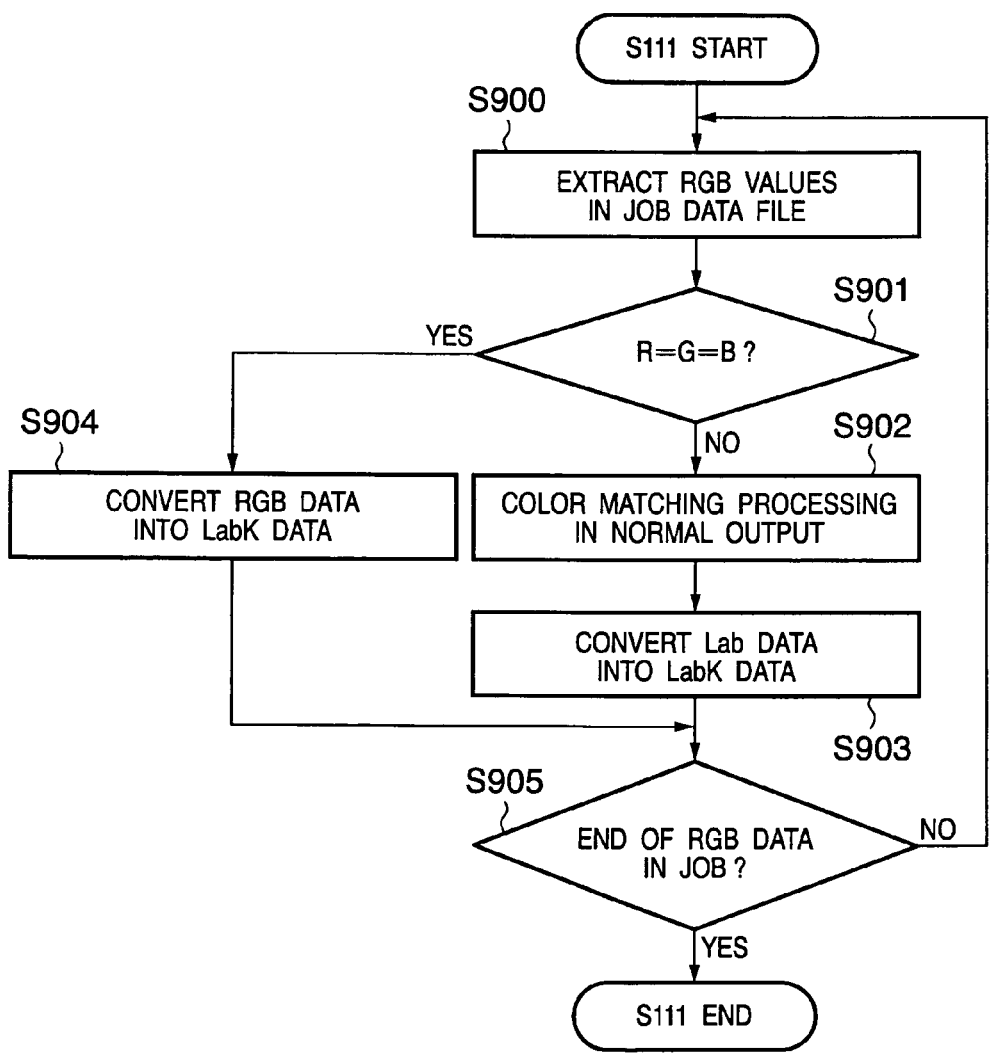
FIG. 19 is a flowchart showing black preservation color matching processing (S111: RGB input) in the job management server of the second embodiment.

FIG. 19 is a flowchart showing details of the processing in step S111 in FIG. 9, i.e., black preservation color matching processing by the color management processing unit 14 in the job management server 100 particularly when the input color space is an RGB space.

RGB data in the job data file is extracted (S900). If R=G=B, i.e., the data is black (gray) data, the RGB values are converted into LabK values (S904).

L=0, a=0, b=0, K=255−R

If NO in step S901, the color management processing unit 14 executes normal color matching processing (S902). The normal color matching processing is executed by using an RGB source profile as the source profile and a Lab profile as the destination profile shown in FIG. 17. The processing is performed while setting "Perceptual" or "Saturation" in the rendering intent flag shown in FIG. 5. Then, the Lab data is converted into LabK data (S903).

L=L, a=a, b=b, K=0

If RGB data remains in the job data file in step S905, the flow returns to step S900. If no RGB data remains, the color matching processing is ended.

With the above-described processing, when the input color space is an RGB space, the color management processing unit 14 in the job management server 100 can create intermediate data having the LabK values saved as the black plate.

(Black Plate Saving Color Matching Processing in Job Management Server (CMYK Input))

Figure 20:
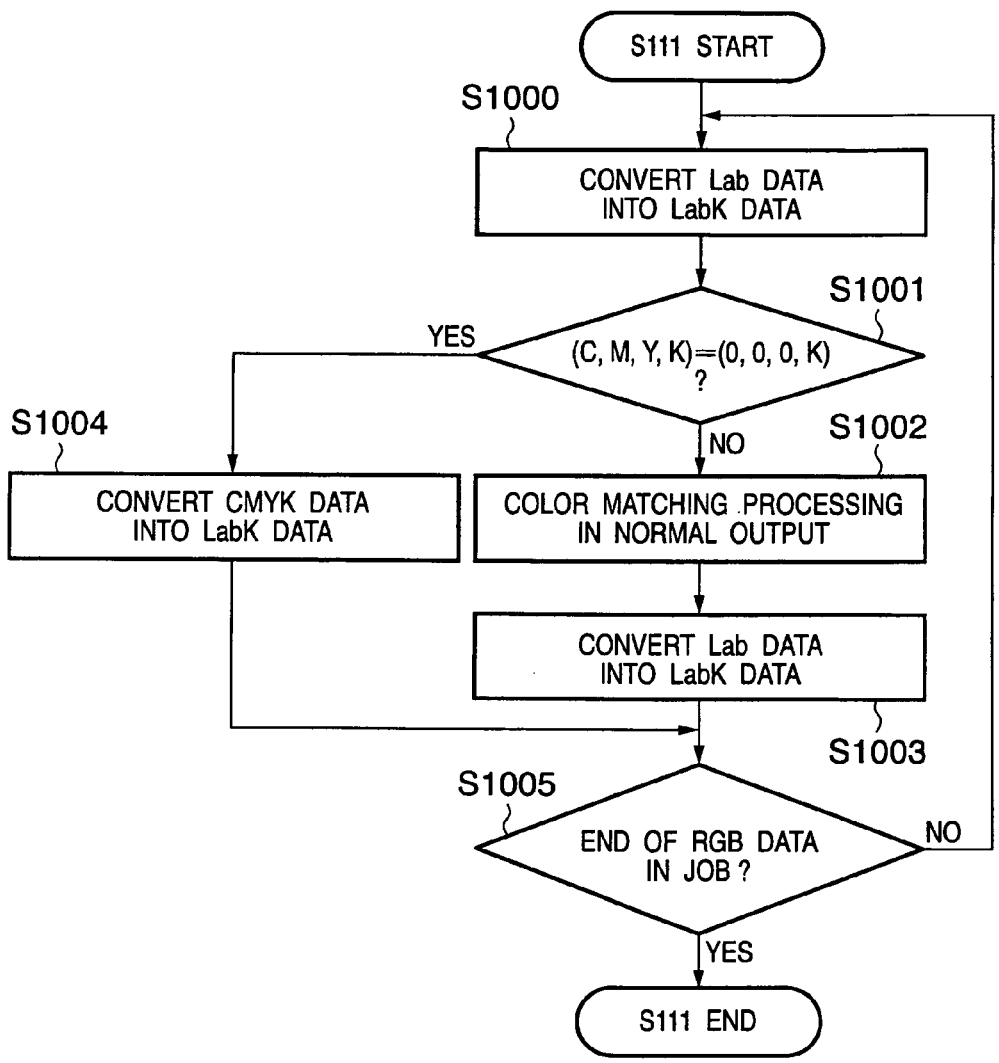
FIG. 20 is a flowchart showing black preservation color matching processing (S111: CMYK input) in the job management server of the second embodiment.

FIG. 20 is a flowchart showing details of the above-described processing in step S111 in FIG. 9, i.e., black preservation color matching processing by the color management processing unit 14 in the job management server 100 particularly when the input color space is a CMYK space.

CMYK data in the job data file is extracted (S1000). If (C,M,Y,K)=(0,0,0,K), i.e., the data is black (gray) data, the CMYK data is converted into LabK data (S1004).

L=0, a=0, b=0, K=K

If (C,M,Y,K)≠(0,0,0,K), the color management processing unit 14 executes normal color matching processing (S1002). The normal color matching processing is executed by using a CMYK source profile as the source profile and a Lab profile as the destination profile shown in FIG. 17. The processing is performed while setting "Colorimetric" in the rendering intent flag. Then, the Lab data is converted into LabK data (S1003).

L=L, a=a, b=b, K=0

If CMYK data remains in the job data file in step S1005, the flow returns to step S1000. If no CMYK data remains, the color matching processing is ended.

With the above-described processing, when the input color space is a CMYK space, the color management processing unit 14 in the job management server 100 can create intermediate data having the LabK values saved as the black plate.

(Black Plate Saving Color Matching Processing in Front-End Server (RGB Input))

Figure 21:
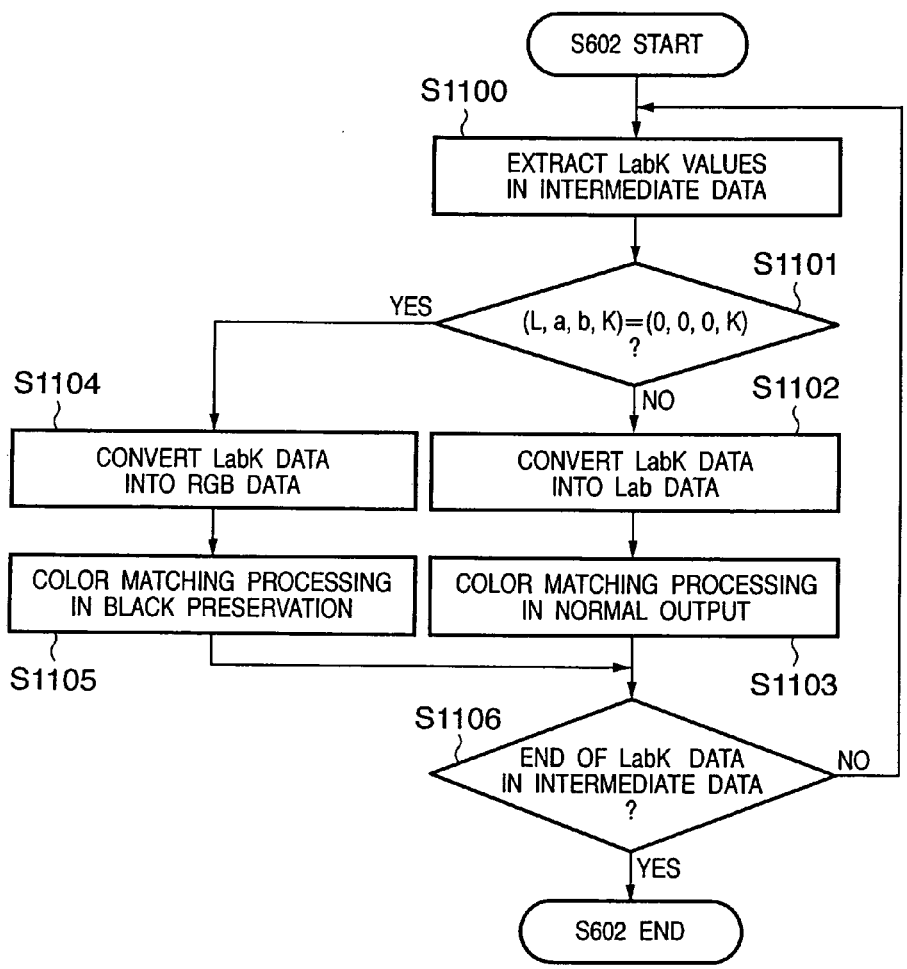
FIG. 21 is a flowchart showing black preservation color matching processing (S602: RGB input) in the front-end server of the second embodiment.

FIG. 21 is a flowchart showing details of the above-described processing in step S602, i.e., black preservation color matching processing by the color management processing units 24 in the front-end servers A 200 and B 300 particularly when the input color space is an RGB space. This processing is executed in the front-end servers A 200 and B 300. Processing in the front-end server A 200 will be exemplified here.

LabK data in the intermediate data file is extracted (S1100). If (L,a,b,K)=(0,0,0,K). i.e., the data is black (gray) data (S1101), the LabK data is converted into RGB values (S1104).

R=255−K, G=255−K, B=255−K

The color management processing unit 24 executes black preservation color matching processing (S1105). The processing is executed by a method described in, e.g., Japanese Patent Laid-Open No. 2004-120566. The processing is executed by using an RGB source profile as the source profile and a printer profile (CMYK) as the destination profile shown in FIG. 8 while setting "Perceptual" or "Saturation" in the rendering intent flag.

If (L,a,b,K)≠(0,0,0,K), the LabK data is converted into Lab data (S1102).

L=L, a=a, b=b

The color management processing unit 24 executes normal color matching processing (S1103). The normal color matching processing is executed by using a Lab profile as the source profile and a printer profile (CMYK) as the destination profile shown in FIG. 18. The processing is executed while setting "Colorimetric" in the rendering intent flag.

If LabK data remains in the job data file, the flow returns to step S1100. If no LabK data remains, the processing is ended.

With the above-described processing, when the input color space is an RGB space, the color management processing unit 24 in the front-end server A 200 can create intermediate data having the printer CMYK values saved as the black plate.

(Black Plate Saving Color Matching Processing in Front-End Server (CMYK Input))

Figure 22:
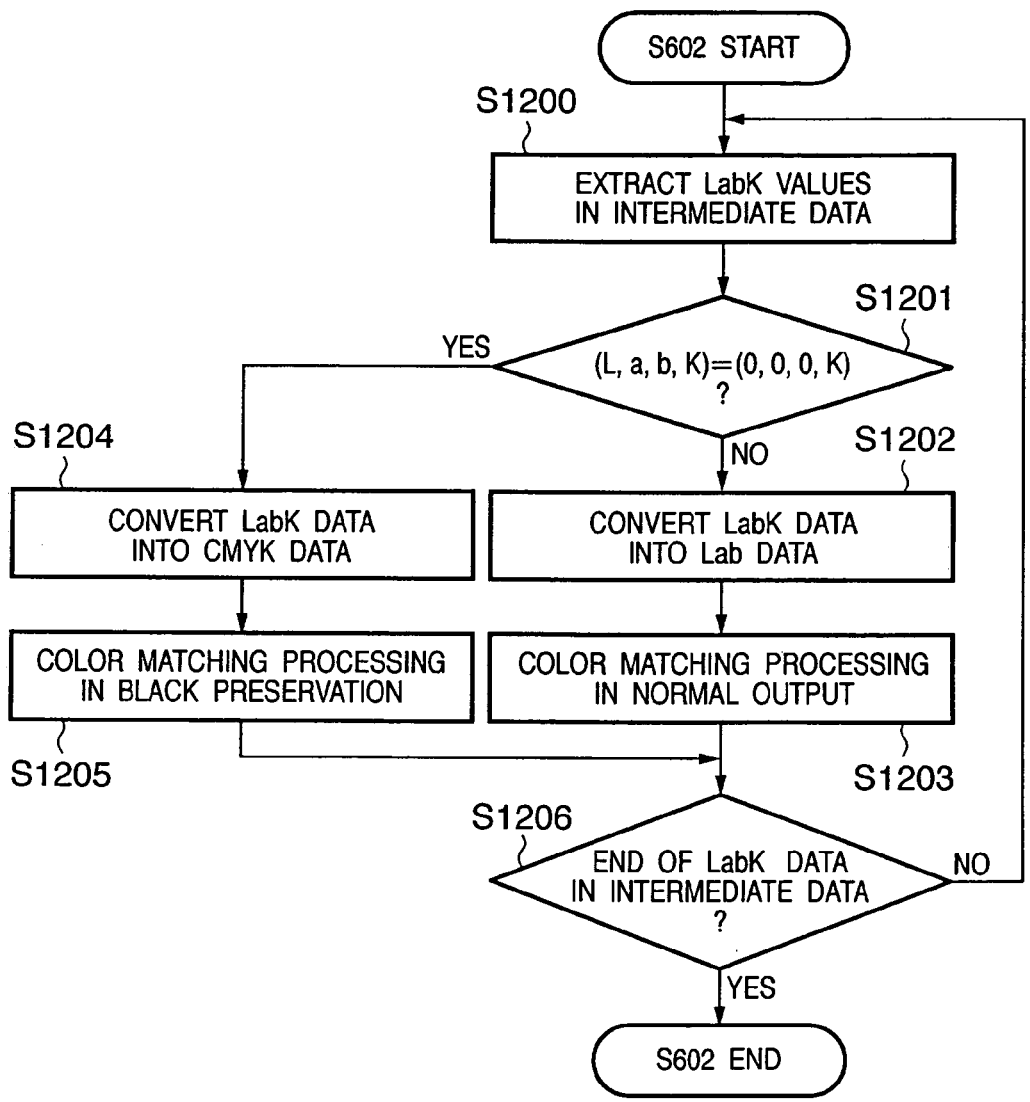
FIG. 22 is a flowchart showing black preservation color matching processing (S602: CMYK input) in the front-end server of the second embodiment.

FIG. 22 is a flowchart showing details of the above-described processing in step S602, i.e., black preservation color matching processing by the color management processing units 24 in the front-end servers A 200 and B 300 particularly when the input color space is a CMYK space. This processing is executed in the front-end servers A 200 and B 300. Processing in the front-end server A 200 will be exemplified here.

LabK data in the intermediate data file is extracted (S1200). If (L,a,b,K)=(0,0,0,K), i.e., the data is black (gray) data, the LabK data is converted into CMYK data (S1204).

C=0, M=0, Y=0, K=K

The color management processing-unit 24 executes black preservation color matching processing (S1205). The black preservation color matching processing is executed by a method in, e.g., Japanese Patent Laid-Open No. 2004-120566. The processing is executed by using a CMYK source profile as the source profile and a printer profile (CMYK) as the destination profile shown in FIG. 8 while setting "Colorimetric" in the rendering intent flag.

If (L,a,b,K)≠(0,0,0,K), the LabK data is converted into Lab data (S1202).

L=L, a=a, b=b

The color management processing unit 24 executes normal color matching processing (S1203). The normal color matching processing is executed by using a Lab profile as the source profile and a printer profile (CMYK) as the destination profile shown in FIG. 18 while setting "Colorimetric" in the rendering intent flag.

If LabK data remains in the job data file, the flow returns to step S1200. If no LabK data remains, the processing is ended.

With the above-described processing, when the input color space is a CMYK space, the color management processing unit 24 in the front-end server A 200 can create intermediate data having the printer CMYK values saved as the black plate.

(Effects of Second Embodiment)

As described above, according to the second embodiment, the same effects as in the above-described first embodiment can be obtained by using Lab data as intermediate data. In addition, the accuracy of color matching between the plurality of printers can be increased.

<Modifications>

In the above-described first and second embodiments, the front-end server and printer engine are separated so that print processing before printer engine output is done in the front-end server. The present invention can also be applied to a printer in which a printer controller and a printer engine are integrated so that print processing before printer engine output is done in the internal printer controller.

Figure 23:
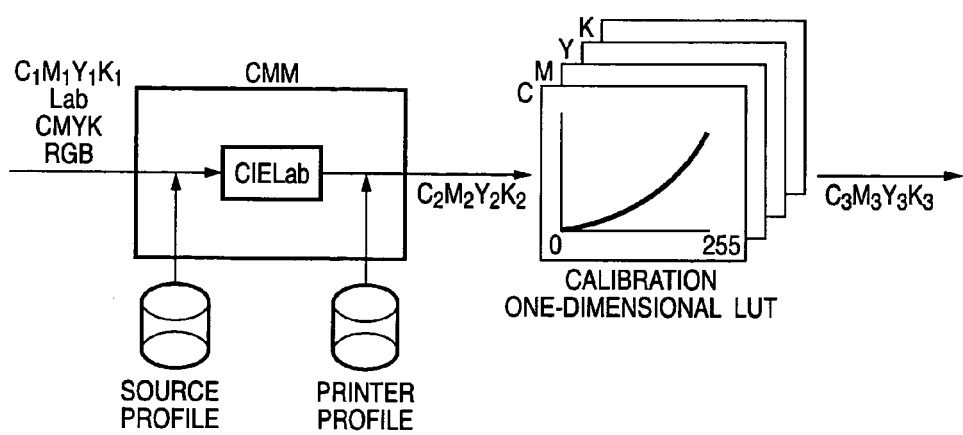
FIG. 23 is a view showing the outline of calibration by updating a one-dimensional density table.

In the first and second embodiments, the profile is updated in calibration processing. However, calibration of the present invention is not limited to this. For example, a one-dimensional density table may be updated without changing the profile. FIG. 23 shows the outline of calibration by updating a one-dimensional density table. Referring to FIG. 23, the profile is fixed. Calibration is implemented by updating a one-dimensional LUT for each color of CMYK.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-140001 filed on May 12, 2005, which is hereby incorporated by reference herein in its entirety.

What is claimed is:

1. An image processing system including a server apparatus and a plurality of image output apparatuses connected to the server apparatus via a local area network (LAN),
wherein the server apparatus comprises:
an intermediate code generation unit configured to generate an intermediate code of a Lab color space on the basis of a page description language by a single analysis of job data for image data to be output;
a first color matching unit configured to execute a first color matching processing for the generated intermediate code to a first reference color space of the plurality of image output apparatuses in accordance with a rendering intent specified from among a plurality of rendering intents, and output intermediate data to be transmitted to the plurality of image output apparatuses as first data in which a color space thereof is corrected to the first reference color space of the connected image output apparatuses; and
an intermediate code transmission unit configured to transmit the first data which has undergone the first color matching processing to each of the plurality of image output apparatuses, and
wherein each of the plurality of image output apparatuses comprises:
a reception unit configured to receive the first data which has undergone the first color matching processing from the server apparatus;
a second color matching unit configured to execute, if the rendering intent indicates a colorimetric color matching scheme, a second color matching processing for the received first data to a second color space of the image output apparatus using a profile corrected by a calibration, and output the processed first data as second data corrected on the second color space;
a rendering unit configured to render a bitmap image on the basis of the second data as intermediate code which has undergone the second color matching processing; and
an image output unit configured to output the rendered image.

2. The system according to claim 1, wherein the server apparatus further comprises:

a color measurement unit configured to execute color measurement of patch data output from any one of the plurality of image output apparatuses;

a profile generation unit configured to generate a profile on the basis of the color measurement result; and a profile transmission unit configured to transmit the generated profile to the image output apparatus that outputted the patch data.

3. The system according to claim 1, wherein each of the plurality of image output apparatuses further comprises:

a patch output unit configured to output predetermined patch data;

a color measurement unit configured to execute color measurement of the patch data; and a profile generation unit configured to generate a profile on the basis of the color measurement result.

4. The system according to claim 1, wherein said image output unit prints the image.

5. An image processing method in an image processing system including a server apparatus and a plurality of image output apparatuses connected to the server apparatus via a local area network (LAN), wherein the server apparatus performs steps comprising:

an intermediate code generation step of generating an intermediate code of a Lab color space on the basis of a page description language by a single analysis of job data for image data to be output;

a first color matching step of executing a first color matching processing for the generated intermediate code to a first reference color space of the plurality of image output apparatuses in accordance with a rendering intent specified from among a plurality of rendering intents, and outputting intermediate data to be transmitted to the plurality of image output apparatuses as first data in which a color space thereof is corrected to the first reference color space of the connected image output apparatuses; and an intermediate code transmission step of transmitting the first data which has undergone the first color matching processing to each of the plurality of image output apparatuses, and wherein each of the plurality of image output apparatuses performs steps comprising:

a code reception step of receiving the first data which has undergone the first color matching processing from the server apparatus;

a second color matching step of executing, if the rendering intent indicates a colorimetric color matching scheme, a second color matching processing for the received first data to a second color space of the image output apparatus using a profile corrected by a calibration, and outputting the processed first data as second data corrected on the second color space;

a rendering step of rendering a bitmap image on the basis of the second data as intermediate code which has undergone the second color matching processing; and an image output step of outputting the rendered image.

6. An image processing apparatus in an image processing system having a plurality of image output apparatuses connected to the image processing apparatus via a local area network (LAN), each of which includes a second color matching unit to execute, if a given rendering intent indicates a colorimetric color matching scheme, a second color matching processing for first data, to a second color space of the image output apparatus using a profile corrected by a calibration, and output the processed first data as second data corrected on the second color space, a rendering unit to render a bitmap image on the basis of the second data as intermediate code which has undergone the second color matching processing, and an image output unit to output the rendered image, the image processing apparatus comprising:

an intermediate code generation unit configured to generate an intermediate code of a Lab color space on the basis of a page description language by a single analysis of job data for image data to be output;

a first color matching unit configured to execute a first color matching processing for the generated intermediate code to a first reference color space of the plurality of image output apparatuses in accordance with a rendering intent specified from among a plurality of rendering intents, and output intermediate data to be transmitted to the plurality of image output apparatuses as first data in which a color space thereof is corrected to the first reference color space of the connected image output apparatuses; and an intermediate code transmission unit configured to transmit the first data which has undergone the first color matching processing to each of the plurality of image output apparatuses.

7. An image output apparatus in an image processing system including a server apparatus connected to the plurality of image output apparatuses via a local area network (LAN), the image output apparatus, comprising:

an intermediate code reception unit configured to receive first data which has undergone a first color matching processing for an intermediate code of a Lab color space to first reference color space of the plurality of image output apparatuses in accordance with a rendering intent specified from among a plurality of rendering intents, and output intermediate data to be transmitted to the plurality of image output apparatuses as first data in which a color space thereof is corrected to the first reference color space of the connected image output apparatuses in the server apparatus;

a second color matching unit configured to execute, if the rendering intent indicates a colorimetric color matching scheme, a second color matching processing for the received first data, to a second color space of the image output apparatus using a profile corrected by a calibration, and output the processed first data as second data corrected on the second color space;

a rendering unit configured to render a bitmap image on the basis of the second data as intermediate code which has undergone the second color matching processing; and an image output unit configured to output the rendered image.

* * * * *